United States Patent
Verwater et al.

(10) Patent No.: US 6,461,509 B1
(45) Date of Patent: Oct. 8, 2002

(54) METHOD AND INSTALLATION FOR PURIFYING CONTAMINATED WATER

(75) Inventors: Johannes Gerardus Maria Verwater, Rhenooy; Renerus Antonius Johannes Maria Visser, Overloon, both of (NL)

(73) Assignee: Rowafil Waterrecycling B.V. (NL)

(*) Notice: Subject to any disclaimer, the term of this patent is extended or adjusted under 35 U.S.C. 154(b) by 0 days.

(21) Appl. No.: 09/415,125

(22) Filed: Oct. 8, 1999

(51) Int. Cl.[7] .................................................. C02F 3/00
(52) U.S. Cl. .................. 210/606; 210/610; 210/617; 210/620; 210/632; 210/220; 210/150; 210/173
(58) Field of Search ................... 210/173, 606, 210/615–617, 610–611, 620, 150, 151, 632, 220

(56) References Cited

U.S. PATENT DOCUMENTS

| | | | |
|---|---|---|---|
| 4,399,041 A | * | 8/1983 | Rappe |
| 4,737,271 A | * | 4/1988 | Childs |
| 4,835,195 A | * | 5/1989 | Rayfield |
| 4,882,059 A | * | 11/1989 | Wong |
| 4,927,751 A | * | 5/1990 | Memmert |
| 5,266,208 A | * | 11/1993 | Stahly |
| 5,683,575 A | * | 11/1997 | Yates |
| 5,834,233 A | * | 11/1998 | Molin |
| 5,985,644 A | * | 11/1999 | Roseman |

FOREIGN PATENT DOCUMENTS

| | | |
|---|---|---|
| EP | 0771761 | 5/1997 |
| EP | 0771761 B1 * | 5/1997 |

* cited by examiner

Primary Examiner—Chester T. Barry
(74) Attorney, Agent, or Firm—Webb Ziesenheim Logsdon Orkin & Hanson, P.C.

(57) ABSTRACT

The present invention relates to a method for purifying contaminated water coming from a carwash and an installation for performing this method. The method comprises the steps of pretreating the contaminated water such that the size of the organic material it contains is smaller than a predetermined cut off value; subsequently carrying the contaminated water in upward direction through a packed bed of particulate material, in which micro-organisms produce exo-enzymes to degrade the organic material in the contaminated water, which bed is aerated from below, and draining the purified water from the packed bed at a level located a determined distance from the top of the bed; wherein an additive is added to the contaminated water to stimulate production of exo-enzymes by the micro-organisms in the packed bed.

21 Claims, 2 Drawing Sheets

METHOD AND INSTALLATION FOR PURIFYING CONTAMINATED WATER

BACKGROUND OF THE INVENTION

1. Field of the Invention

The present invention relates to a method as well as an installation for purifying contaminated water coming from a carwash.

2. Description of the Prior Art

Due to stricter environmental legislation it is in some cases no longer allowed to discharge the contaminated water coming from a carwash directly into the environment. It is now compulsory for such companies to purify the contaminated water before it may be discharged. It is preferred however that the degree of purification is such that it is possible to re-use the purified water in the carwash. Re-use of purified water is further preferred because of a shortage of clean water and because water is becoming more and more expensive.

Many techniques are known for purifying contaminated water. The technique applied in practice depends on many factors, such as the nature of the contamination in the water, the desired degree of purification, cost and the like. An example of a purification technique is the use of sand filters. The most important function of the sand filter is the filtering out of the contaminants. During filtration other processes can however also occur, such as adsorption of substances to the sand particles and degradation of organic material by micro-organisms.

The currently known purification techniques do not always provide the desired result. With many tested techniques the desired degree of purification was not obtained or the operational management was uncertain. Other techniques which did provide the desired result were found to be unfeasible from the aspect of cost.

Operational reliability is moreover essential, because the purified water is preferably used again in the cleaning proces of the car wash. A purification installation which does not operate or operates badly can for example result in damaged cars, when the re-used water still contains relatively coarse particles.

It is therefore the object of the present invention to provide a method and an installation for purifying contaminated water coming from a car wash, wherein the desired degree of purification is obtained, the operational management is certain and both the investment costs and the operational management costs are more favorable than with application of currently known techniques.

SUMMARY OF THE INVENTION

This is achieved by the invention by a method comprising the steps of:

pretreating the contaminated water such that the size of the organic material it contains is smaller than a pre-determined cut off value;

subsequently carrying the contaminated water in upward direction through a packed bed of particulate material, in which micro-organisms produce exo-enzymes to degrade the organic material in the contaminated water, which bed is aerated from below, and draining the purified water from the packed bed at a level located a determined distance from the top of the bed; wherein an additive is added to the contaminated water to stimulate production of exo-enzymes by the micro-organisms in the packed bed.

Prior to feeding of the contaminated water to the packed bed, the contaminated water is pretreated such that the organic material it contains is smaller than a predetermined cut off value. Because of this the functioning of the packed bed can be optimized. The cut off value depends mainly on the desired degree of purification. Experimentally it is found that a cut off value of 100 $\mu$m provides a satisfactorily purification degree. However, when a cut off value of 20 $\mu$m is taken into account it is possible to re-use the purified water for high pressure car wash installations. Most preferably the cut off value is 5 $\mu$m such that a optimal functioning of the packed bed is obtained. In this case sludge forming and accumulation of bio mass at the top of the bed is prevented, whereby the period of operation of the bed is longer.

In the upward flow of water through a packed bed of particulate material the problem of expansion could occur. The bed expands due to the flow, the packing is disturbed, "craters" are created and adequate filtration can no longer take place. Therefore the water is drained at a level located a determined distance from the top of the bed before the water reaches the uppermost part of the bed. The top layer of the bed ensures that the particulate material of the bed remains well packed, such that expansion is prevented and the filter action preserved.

The bed is aerated from below to provide sufficient oxygen for the micro-organisms to produce exo-enzymes which degrade the organic material in the contaminated water. The aeration preferably takes place by means of block aerators consisting of a relatively flat housing provided on at least one side with a plate of porous material, e.g. sintered plastic. The housing comprises an inlet opening for air, which air flows out again as small bubbles via the porous plate. The use of porous sintered plastic, in particular polyethylene, results in an exceptionally good distribution of the supplied air. In addition, the material is very inexpensive compared with alternative materials and it has been found that the material is not susceptible to contamination and is thereby operationally very reliable. However, other aerating means can of course also be applied such as tubes with apertures.

Further an additive is added to the contaminated water to stimulate production of exo-enzymes by the micro-organisms in the packed bed. These exo-enzymes degrade the organic material in the contaminated water. The additive is preferably added immediately before the contaminated material is carried through the packed bed, such that no additive is lost in the pretreating step during purification of the contaminated water. Furthermore, the additive preferably consists of at least one of a vegetable extract and a nutrient medium for providing extra nutrition for the micro-organisms and ensuring the micro-organism will keep growing even when the purification installation is not running. Preferably the micro-organisms are bacteria. It is found that micro-organisms, and especially bacteria, are functioning extremely well when the particulate material of the packed bed consists of bio carriers. These are canister like elements made of plastic, for example polyethylene, with a open structure. The open structure provides an enlarged area on which the bacteria can settle and ensures a good flow through the carriers.

According to one aspect of the present invention the step of pretreating comprises the step of reducing the size of the organic material in the contaminated water. This is preferably effected by means of grinding. Contaminants, especially particles which will not settle and remain floating in the contaminated water, e.g. cigarette butts and bristles, will be reduced in size.

According to another aspect of the present invention the step of pretreating comprises the step of removing from the contaminated water organic material with a size larger than the cut off value. This is preferably effected by means of a hydrocyclone. The contaminated water leaving the hydrocyclone as the upperflow contains contaminants of a size smaller than the cut off value, whereas the underflow of the hydrocyclone besides some contaminated water contains contaminants of a size larger than the cut off size. It is possible, and preferable, to let the underflow flow back to the beginning of the pretreating step.

The step of pretreating can, according to the invention, in addition comprises the step of removing volatile components from the contaminated water by means of stripping. Volatile components, in particular hydrocarbons, for example gasoline and light fractions of oil, can thus be removed from the contaminated water and possibly be treated before it is brought into the environment. Preferably the stripping is effected by means of blowing air through the contaminated water. Next to removal of volatile components from the contaminated water, the growth of anaerobic bacteria is impossible.

Contaminants which are not separated out in the pretreating step and which are not degraded in the filter bed, mainly inert material such as sand, will eventually leave the bed together with drainage of the purified water. The purified water is collected in a clear water container, in which the inert material not being removed will settle. These settlings are removed from the clear water container by means of bottom overflow and can flow back to the beginning of the purification proces. Purified water can be withdrawn from this clear water container by means of a pump.

The present invention further relates to an installation for performing the method according to the invention. The installation comprises means for pretreating the contaminated water such that the size of the organic material it contains is smaller than a predetermined cut off value, said pretreating means being connected to means for transporting the pretreated contaminated water to a packed bed of particulate material, in which micro-organisms produce exo-enzymes to degrade the organic material in the contaminated material, said packed bed comprising a duct for introducing the contaminated water near the bottom of the bed, a duct for draining purified water from the bed at a level located a determined distance from the top of the bed and an aerator located near the bottom of the bed, wherein the installation further comprises an inlet point for adding an additive to the contaminated water to stimulate production of exo-enzymes by the micro-organisms in the packed bed. Further aspects and advantages of the installation are described below with reference to the accompanying drawings, in which a preferred embodiment of the invention is depicted.

DETAILED DESCRIPTION OF THE PREFERRED EMBODIMENTS

Figure 1:
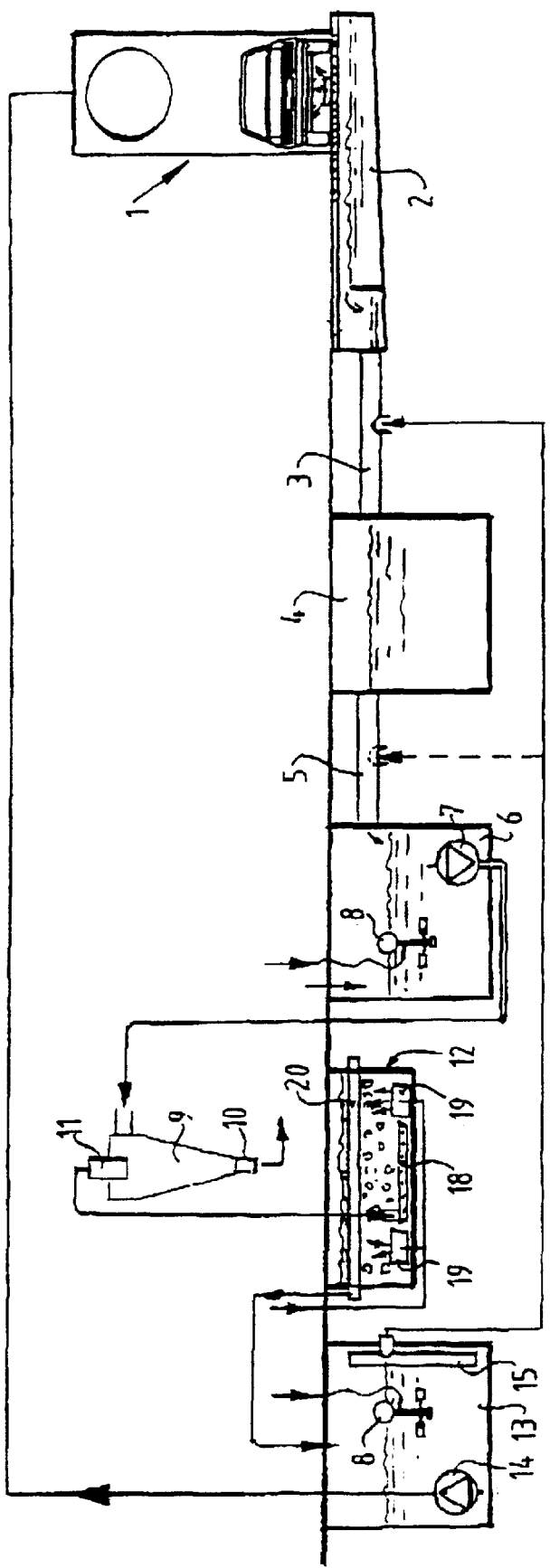
FIG. 1 shows schematically a preferred embodiment of an installation for purifying contaminated water in combination with a car wash.

First reference is made to FIG. 1. Reference number 1 denotes a car wash in which water is used to clean cars. This water is contaminated with all kinds of contaminants, such as gasoline, oil, grease, cleaning agents, wax, sand, but also leaves, cigarette butts, bristles, etc. Underneath the floor of the car wash 1 a collecting basin 2 is applied, which basin is sealed from the surrounding ground such that the contaminated water is prevented from ending up in the environment. From the basin 2 a pipe 3 leads to a sludge container 4 for collecting the contaminated water. In this sludge container 4 it is possible for some of the contaminants to settle. A second pipe 5 is connected between the sludge container 4 and a pretreatment container 6. In this pretreatment container 6 there is provided a grinder pump 7 and an aerator 8. By means of the grinder pump 7 the size of organic material contained in the contaminated water is reduced, preferably to a size smaller than 1 mm. The aerator 8 blows air through the contaminated water to remove volatile components therefrom. The grinder pump 7 pumps the contaminated water to a hydrocyclone 9, in which organic material of a size larger than the cut off value will be separated from the contaminated water, which leaves the hydrocyclone 9 as the underflow through the lower outlet 10. The cut off value is preferably 100 $\mu$m. More preferably a cut off value of 20 $\mu$m is taken into account such that the purified water can be re-used in high pressure car wash installations. However, when a cut off value of 5 $\mu$m is used an optimal functioning of the packed bed (described below) is obtained. The majority of the contaminated water comprising organic material of a size smaller than the cut off value leaves the hydrocyclone 9 as the upperflow through the upper outlet 11. The upper outlet 11 of the hydrocyclone 9 is connected to a packed bed 12 of particulate material, in which micro-organisms produce exo-enzymes to degrade the organic material in the contaminated water.

Before the contaminated water is supplied to the bed 12, an additive is added to the water to stimulate production of exo-enzymes by the micro-organisms in the packed bed 11. The purified water is drained from the bed 12 at a level located a determined distance from the top of the bed 12 into a container 13 for clear water. By means of a pump 14 applied in the clear water container 13 purified water is pumped to the car wash 1 for re-use. Because it is possible that the purified water still contains inert material, which will settle in the clear water container 13, the container 13 is provided with a bottom overflow pipe 15 extending almost to the bottom of the container 13. The overflow pipe 15 is in communication with the surrounding atmosphere. Therefore, due to the principle of communicating vessels, the inert material will be removed from the bottom of the clear water container 13 and flow back to the beginning of the purification process, which can be the sludge container 4 or the pretreatment container 6 (as indicated with the dashed line). An floatable aerator 8 can be provided in this clear water container 13 such that the growth of anaerobic bacteria is impossible and an odorless water condition is maintained.

Figure 2:
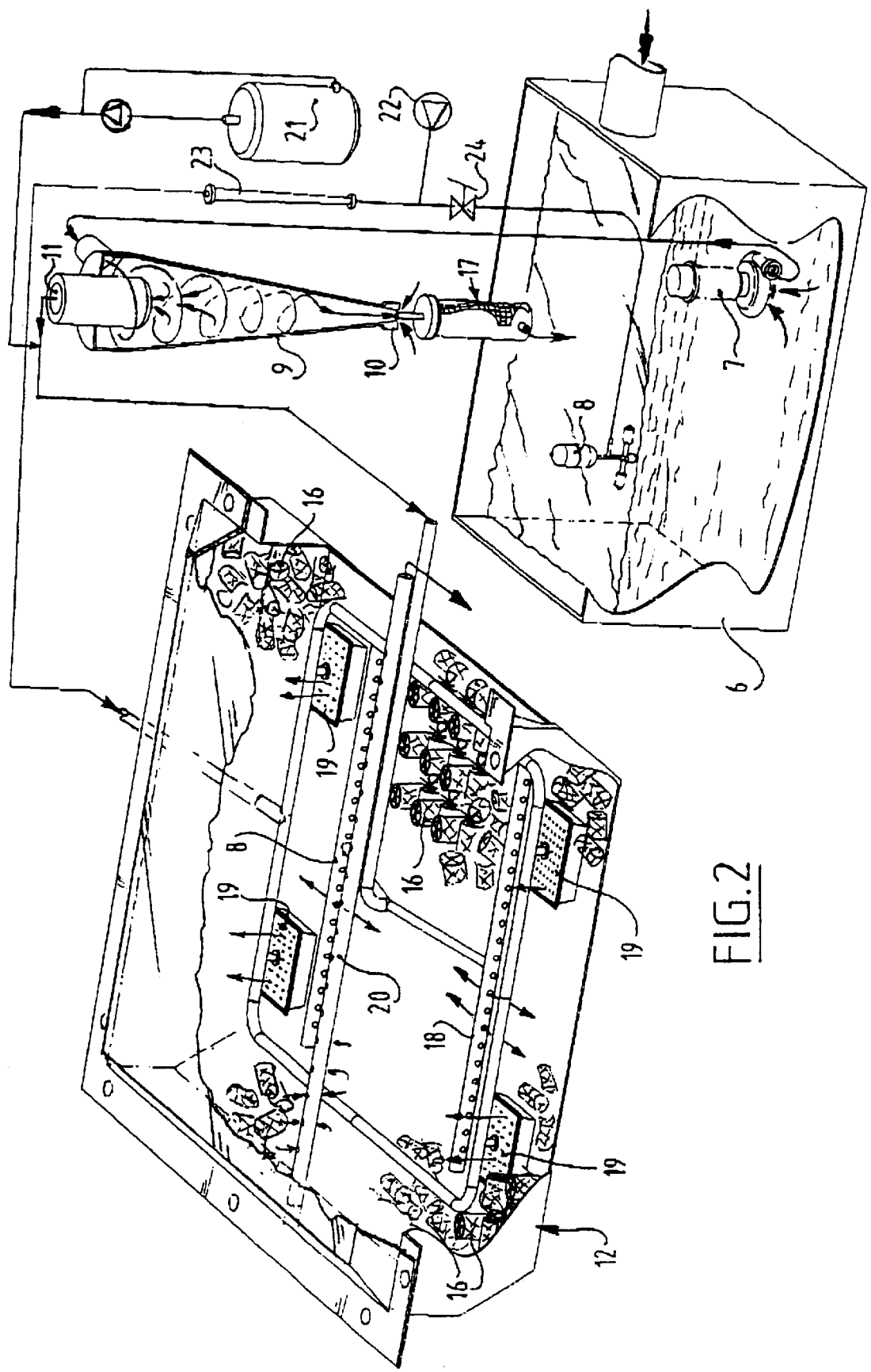
FIG. 2 shows a perspective view of the preferred embodiment of the installation.

Next reference is made to FIG. 2. This figure shows in perspective view the pretreatment container 6, the hydrocyclone 9 and the packed bed 12 filled with bio carriers 16. The contaminated water coming from the car wash 1 is collected in the pretreatment container, in which volatile components are removed by blowing air through the water by means of a floatable aerator 8. The grinder pump 7 provides for pumping the contaminated water to the hydrocyclone 9 as well as reducing the size of the organic material in the contaminated water. Contaminated water enters the hydrocyclone 9 tangentially under pressure. As a result of high centrifugal forces organic material larger than the cut off value migrate into a primary vortex adjacent to the wall of the hydrocyclone 9 and move downwards to discharge with a small volume of water via the under outlet 10. From there it flows into a filter pouch 17, in which the coarser material is retained and the water with finer material flows back into the pretreatment container 6. Organic material with a size smaller than the cut off value migrate into a secondary upward-moving vortex. along the axis of the hydrocyclone 9, and discharge with the majority of the water via the upper outlet 11 to the packed bed 12.

The packed bed 12 comprises a tube 18 for introducing the contaminated water near the bottom of the bed 12. In the tube there are provided apertures lying in the horizontal plane, such that the contaminated water is introduced in the bed 12 over the whole width thereof. The bed 12 is further provided with aerators 19 located near the bottom of the bed 12 for delivering oxygen to the bed 12. Furthermore, a tube 20 for draining purified water from the bed 12 is applied in the middle section of the bed 12 at a determined distance from the top of the bed 12 (see also FIG. 1). This tube 20 is provided with apertures lying in the vertical plane. It is has been found that horizontal feed and vertical drain results in an optimal flow path for the water to be purified.

Before the contaminated water enters the bed 12 an additive is added. This additive is mixed in a reservoir 21 and from there brought to an inlet point located after the hydrocyclone 9 where it is added to the contaminated water. The air for the block aerators 19 in the bed and the floatable aerator 8 in the pretreatment container is brought into the system by means of pump 22. A flow meter 23 and a valve 24 can be provided to control the air flow supply.

The invention is not limited to the embodiment described and shown in the figures. For example, it is possible to combine the sludge container 4 and the pretreatment container 6.

What is claimed is:

1. A method for purifying contaminated water produced as a car wash effluent, comprising the steps of:
   pretreating the contaminated water such that the size of the organic material it contains is smaller than a pre-determined cut off value of 100 $\mu$m;
   subsequently carrying the contaminated water in upward direction through a packed bed of particulate material, in which bacteria produce exo-enzymes to degrade the organic material in the contaminated water, which bed is aerated from below, and draining the purified water from the packed bed at a level located a determined distance from the top of the bed; wherein
   an additive is added to the contaminated water to stimulate production of exo-enzymes by the bacteria in the packed bed.

2. A method as claimed in claim 1, wherein the step of pretreating comprises the step of reducing the size of the organic material in the contaminated water.

3. A method as claimed in claim 2, wherein the organic material in the contaminated water is reduced in size by means of grinding.

4. A method as claimed in claim 1, wherein the step of pretreating comprises the step of removing from the contaminated water organic material with a size larger than the cut off value.

5. A method as claimed in claim 4, wherein the organic material of a size larger than the cut off value is removed from the contaminated water as the underflow of a hydro-cyclone.

6. A method as claimed in claim 1, wherein the step of pretreating in addition comprises the step of removing volatile components from the contaminated water by means of stripping.

7. A method as claimed in claim 6, wherein the stripping is effected by means of blowing air through the contaminated water.

8. A method as claimed in claim 1, wherein the cut off value is 20 $\mu$m.

9. A method as claimed in claim 8, wherein the cut off value is 5 $\mu$m.

10. A method as claimed in claim 1, wherein the additive is added immediately before the contaminated material is carried through the packed bed.

11. A method as claimed in claim 10, wherein the additive consists of at least one of a vegetable extract and a nutrient medium.

12. A method as claimed in claim 1, wherein the particulate material of the packed bed consists of bio carriers.

13. A method for purifying contaminated water produced as car wash effluent, comprising the steps of:
   blowing air through the contaminated water to remove volatile components from the contaminated water;
   reducing the size of the organic material in the contaminated water by means of grinding;
   carrying the contaminated water through a hydro-cyclone in order to remove organic material of a size larger than 5 $\mu$m from the contaminated water as the underflow of the hydrocyclone;
   subsequently carrying the contaminated water in upward direction through a packed bed of bio carriers, in which bacteria produce exo-enzymes to degrade the organic material in the contaminated water, which bed is aerated from below, and draining the purified water from the packed bed at a level located a determined distance from the top of the bed; wherein
   immediately before the contaminated water is carried through the packed bed an additive is added to the contaminated water to stimulate production of exo-enzymes by the bacteria in the packed bed.

14. A method for purifying contaminated water coming from a car wash, comprising the steps of:
   pretreating the contaminated water such that the size of the organic material it contains is smaller than a pre-determined cut off value and removing from the contaminated water organic material with a size larger than the cut off value, wherein the organic material of a size larger than the cut off value is removed from the contaminated water as the underflow of a hydrocyclone;
   subsequently carrying the contaminated water in upward direction through a packed bed of particulate material in which bacteria produce enzymes to degrade the organic material in the contaminated water, which bed is aerated from below, and draining the purified water from the packed bed at a level located a determined distance from the top of the bed; wherein
   an additive is added to the contaminated water to stimulate production of exo-enzymes by the bacteria in the packed bed.

15. A method for purifying contaminated water coming from a car wash, comprising the steps of:
   pretreating the contaminated water such that the size of the organic material it contains is smaller than a pre-determined cut off value;
   subsequently carrying the contaminated water in upward direction through a packed bed of particulate material in which bacteria produce enzymes to degrade the organic material in the contaminated water, which bed is aerated from below, and draining the purified water from the packed bed at a level located a determined distance from the top of the bed; wherein an additive is added to the contaminated water to stimulate production of exo-enzymes by the bacteria in the packed bed, wherein the additive is added immediately before the contaminated material is carried through the packed bed and wherein the additive consists of at least one of a vegetable extract and a nutrient medium.

16. An installation for purifying contaminated water produced as car wash effluent, comprising:

means for pretreating the contaminated water such that the size of the organic material it contains is smaller than a predetermined cut off value of 100 $\mu$m, said pretreating means being connected to means for transporting the pretreated contaminated water to a packed bed of particulate material in which bacteria produce exo-enzymes to degrade the organic material in the contaminated material, said packed bed comprising:
a duct for introducing the contaminated water near the bottom of the bed, a duct for draining purified water from the bed at a level located a determined distance from the top of the bed, and
an aerator located near the bottom of the bed,
wherein the installation further comprises an inlet point for adding an additive to the contaminated water to stimulate production of exo-enzymes by the bacteria in the packed bed.

17. An installation as claimed in claim 16, wherein the pretreating means comprise a grinder.

18. An installation as claimed in claim 16, wherein the pretreating means comprise a hydrocyclone, the upperflow outlet thereof being connected to the packed bed.

19. An installation as claimed in claim 16, wherein the pretreating means in addition comprise a container for the contaminated water provided with an aerator for blowing air through the contaminated water in the container.

20. An installation as claimed in claim 16, wherein the particulate material in the packed bed consists of bio carriers.

21. An installation for purifying contaminated water coming from a car wash, comprising:

means for pretreating the contaminated water such that the size of the organic material it contains is smaller than a predetermined cut off value, wherein the pretreating means comprise a hydrocyclone, the upperflow outlet thereof being connected to the packed bed, said pretreating means being connected to means for transporting the pretreated contaminated water to a packed bed of particulate material in which bacteria produce exo-enzymes to degrade the organic material in the contaminated material, said packed bed comprising:
a duct for introducing the contaminated water near the bottom of the bed,
a duct for draining purified water from the bed at a level located a determined distance from the top of the bed, and
an aerator located near the bottom of the bed, and wherein the installation further comprises an inlet point for adding an additive to the contaminated water to stimulate production of exo-enzymes by the bacteria in the packed bed.

* * * * *